United States Patent
Verrelst et al.

(10) Patent No.: US 10,935,073 B2
(45) Date of Patent: *Mar. 2, 2021

(54) BEARING DAMPER ELEMENT, BEARING AND COMPRESSOR ELEMENT PROVIDED WITH SUCH A BEARING DAMPER ELEMENT AND METHOD FOR MANUFACTURING SUCH A BEARING DAMPER ELEMENT

(71) Applicant: ATLAS COPCO AIRPOWER, NAAMLOZE VENNOOTSCHAP, Wilrijk (BE)

(72) Inventors: Bjorn Verrelst, Wilrijk (BE); Hans Meeus, Wilrijk (BE); Guido Jan Bal, Wilrijk (BE); Koen Lea F. Peeters, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/618,221

(22) PCT Filed: May 17, 2018

(86) PCT No.: PCT/IB2018/053464
§ 371 (c)(1),
(2) Date: Nov. 29, 2019

(87) PCT Pub. No.: WO2019/002959
PCT Pub. Date: Jan. 3, 2019

(65) Prior Publication Data
US 2020/0116200 A1    Apr. 16, 2020

(30) Foreign Application Priority Data
Jun. 26, 2017    (BE) .................................. 2017/5449

(51) Int. Cl.
*F16C 27/04* (2006.01)
*F16C 19/26* (2006.01)
*F16C 33/58* (2006.01)

(52) U.S. Cl.
CPC ............ *F16C 27/045* (2013.01); *F16C 19/26* (2013.01); *F16C 33/586* (2013.01)

(58) Field of Classification Search
CPC ...... F16C 27/045; F16C 19/26; F16C 33/586; F16F 15/0237; F01D 25/162; F01D 25/164
See application file for complete search history.

(56) References Cited

U.S. PATENT DOCUMENTS

| 5,531,522 A | 7/1996 | Ide et al. |
| 5,603,574 A * | 2/1997 | Ide ...................... F16F 15/0237 384/117 |

(Continued)

FOREIGN PATENT DOCUMENTS

| JP | 2011144924 A * | 7/2011 | ............ F16C 27/045 |
| WO | 9322575 A1 | 11/1993 | |

(Continued)

OTHER PUBLICATIONS

Machine Translation of JP-2011144924-A (Year: 2011).*

(Continued)

*Primary Examiner* — Alan B Waits
(74) *Attorney, Agent, or Firm* — Bacon & Thomas, PLLC (57) ABSTRACT

A bearing damper element includes a ring mounted between a rotating object and a supporting object which supports the ring. The ring includes at least three slits through the thickness of the ring in the axial direction and at a distance of the radial inner and outer surface of the ring. At least half of the slits have one or more damping parts with a maximum (Continued)

width of 0.5 millimeters, whereby the damping parts are concentric and do not overlap.

20 Claims, 5 Drawing Sheets (56) References Cited

U.S. PATENT DOCUMENTS

| | | | | |
|---|---|---|---|---|
| 7,845,855 | B2* | 12/2010 | Bischof | F16C 17/035 384/117 |
| 8,353,633 | B2* | 1/2013 | Griffin | F16C 23/10 384/255 |
| 2009/0263057 | A1* | 10/2009 | Kanki | B23H 9/00 384/99 |

FOREIGN PATENT DOCUMENTS

| | | |
|---|---|---|
| WO | 2007047976 A1 | 4/2007 |
| WO | 2011088004 A2 | 7/2011 |

OTHER PUBLICATIONS

International Search Report and Written Opinion in corresponding PCT Application No. PCT/IB32018/053464, dated Sep. 13, 2018.
International Preliminary Report on Patentability in corresponding PCT Application No. PCT/IB2018/053464, dated May 20, 2019.

\* cited by examiner

BEARING DAMPER ELEMENT, BEARING AND COMPRESSOR ELEMENT PROVIDED WITH SUCH A BEARING DAMPER ELEMENT AND METHOD FOR MANUFACTURING SUCH A BEARING DAMPER ELEMENT

The present invention relates to a bearing damper element.

In particular, the invention is meant for application in rotating machines, such as for example turbo machines or screw-type compressors, in which a shaft of a rotor is set up rotatably in the housing of the machine by means of a number of bearings.

BACKGROUND OF THE INVENTION

It is known that machines which rotate at high speed often contend with vibration problems within one or several particular speed ranges, predominantly when there are resonances in these ranges.

In such ranges, the vibration level can become so high that damage occurs inside the machine.

In some cases, it is possible to avoid this problem by avoiding these speed ranges.

That implies that one will try to avoid such speeds and at the moment when it is necessary to switch through these speed ranges when accelerating or slowing down, it will be done quickly to thus avoid or at least limit damage, if any.

It goes without saying that it is more desirable to design a machine in such a way that these vibration problems are not present or only to a very limited extent.

That requires the adjustment of the rotor dynamics, which are mostly determined by the rigidity of the (rotating) shaft of the machine and/or the rigidity of the bearings of the shaft.

As the construction and assembly of the machine lays down strict dimensions, adjusting the rigidity of the shaft of the machine is extremely limited, such that adjusting the rigidity of the bearings is often a better choice, in so far the bearing dimensioning allows it.

As vibration problems can never be fully excluded, it is preferential to also provide the bearings with some damping characteristics which will ensure that the occurring vibrations are reduced to an acceptable level.

Liquid bearings are known which already have damping characteristics and can also rotate at very high speeds, and therefore are particularly suitable for use in turbo machines.

However, liquid bearings generate greater bearing losses than roller bearings. Moreover, liquid bearings can be subject to unstable behaviour, which can be very destructive. Such risk of unstable behaviour is inherent to the rotation of the shaft in a liquid film.

That is why roller bearings are also used often. To solve the disadvantage of such roller bearings, more specifically the fact that they have no or practically no damping characteristics, they are often used in high-speed applications in combination with so-called bearing damper elements.

Please note that roller bearings refer to all bearings that consist of at least two rings between which rolling elements roll over runners in these rings. The rolling elements can be ball-shaped, cylindrical, conical or barrel-shaped.

A first possible bearing damper element is a so-called "squirrel cage damper" consisting of a projecting element, the "squirrel cage", which will take care of the rigidity and position a ring around (or in) the bearing such that between this ring and the bearing there is a precise gap, the damper gap. In this damper gap a thin film is applied, the "squeeze film", which is responsible for the damping. Usually oil or another, to a lesser or greater extent, viscous liquid is used for this thin film.

An example of such "squirrel cage damper" is described in the article "Design and application of squeeze film dampers in rotating machinery" by Fouad Y. Zeidan— Proceedings of the Twenty-Fifth Turbomachinery Symposium, Turbomachinery Laboratory, Texas A&M University, p 169-188, 1996.

Although both the rigidity and the damping characteristics can be adjusted, it is a disadvantage of such "squirrel cage damper" that it is not only expensive, but also takes up a lot of room, particularly in the axial direction or sense.

An additional disadvantage is that all components of the "squirrel cage damper" need to be manufactured and finished to very exact specifications, because the thickness of the damper gap, which determines the thickness of the thin film, needs to be determined precisely to obtain the desired damping characteristics.

In US 2009263057 an alternative bearing damper element is described, whereby in one ring of the roller bearing, slits are made by means of wire ELM or wire electrodischarge machining.

By filling the slits with a viscous liquid, such as e.g. oil, a thin film damper ("squeeze film damper") is created.

Moreover, the form of the slits creates a sort of leaf springs which will determine the rigidity of the damper and thus the rigidity of the support of the shaft in the bearing damper element.

This means these slits simultaneously create thin film dampers and leaf springs.

The creation of the spring and the damper in one component, i.e. the inner ring or the outer ring of the roller bearing, not only results in a compact design, but also allows the damper gap to be determined very precisely.

The bearing damper element in US 2009263057 has a number of disadvantages.

First of all, the slits are relatively long, such that it is not possible to guarantee that the slits are always completely filled with oil, which is necessary for the efficient operation of the bearing damper element.

Secondly, the combined damper and spring system means it is difficult to achieve a certain rigidity in combination with a particular damping capacity as both are very strongly connected.

The combined spring and damper behaviour of a certain design is very difficult to predict and many complex simulations are often necessary.

Moreover, it is not certain that a particular combination of rigidity and damping can be realised.

The combined damper and spring system also results in a design with several concentric thin film dampers. Consequently, the force in the radial direction will be accommodated by several thin film dampers in series, such that every thin film damper will become less effective and the damping capacity decreases.

Furthermore, it is not possible either to make a split design, as the thin film damper cannot be intersected.

SUMMARY OF THE INVENTION

The purpose of the present invention is to provide a solution to at least one of the aforementioned and other disadvantages.

The object of the present invention is a bearing damper element which comprises a ring mounted between a rotating object and a supporting object which supports the ring, whereby the ring comprises at least three slits through the thickness of the ring in the axial direction and at a distance of the radial inner and outer surface of the ring, characterised in that at least half of the slits have one or more damping parts with a maximum width of 0.5 millimetres, whereby the damping parts are concentric and do not overlap and in that at least one slit has one or more spring parts with a minimum width that is greater than the width of the damping parts.

'Slit' here refers to a groove, split, incision or the like, whereby it is important that these slits extend through the entire thickness of the ring in an axial direction.

First of all, the advantage of such bearing damper element is that it is very compact, more specifically in the axial direction, certainly compared to the known squirrel cage dampers'.

This provides the advantage that by making some (parts of the) slits thinner, they will have damping characteristics, whereby they are at least partially uncoupled from the spring characteristics of the other (parts of the) slits.

In other words, different types of (parts of) slits exist, which will each predominantly have another characteristic, i.e. either predominantly damping characteristics, or predominantly spring characteristics.

That results in a design in which the damping characteristics are less coupled to the spring characteristics of the bearing damper element, such that a particular rigidity can be realised without influencing the damping capacity.

Furthermore, by using several slits they can be made shorter, such that it can be guaranteed that they can be completely filled with a viscous liquid.

Another advantage is that by avoiding that these damping parts do not overlap, no concentric buffering film dampers are created, such that every thus created buffering film damper will have a maximum damping capacity.

Preferably, at least half of the slits have one or more damping parts if the number of slits is even and all slits have one or more damping parts if the number of slits is uneven.

The advantage is that the design of the bearing damper element can always be made symmetrically.

Preferably, at least a part of the slits, and preferably every slit, is on both ends provided with a hole through the thickness of the ring in the axial direction.

This hole, or cavity, perforation or the like, will alleviate the stress concentration which may develop during the use of the bearing damper element at the end of the slits.

Furthermore, such holes are often also necessary to be able to create the slits in the ring whereby first these holes are drilled to subsequently put through wire, such that the slits can be cut by means of wire electrodischarge machining. The holes can be made with other techniques than drilling, e.g. die-sink electrical discharge machining, laser drilling, etc.

According to the invention, at least one slit has one or more spring parts with a minimum width which is greater than the width of the damping parts.

By providing a minimum width for the spring parts of the slits, a structure can be provided in the ring which will have a certain flexibility or spring function and which in other words will have a certain rigidity.

Indeed, the slits have a flexibility until they are closed by the vibrations, such that slits that are too narrow or thin are closed too quickly by the vibrations and thus have very little flexibility. By guaranteeing a minimum width for the spring parts, this can be avoided.

In a practical embodiment at least a part of the damping parts of one or more slits are filled with a viscous liquid.

It is not excluded of course that all damping parts of all slits are filled with the viscous liquid.

This will create a thin film damper in these slits. With the help of such thin film damper a relatively high damping can be achieved in a limited space, which is not always possible in other types of damping, e.g. with the help of rubber.

In preferred embodiments, measures are taken to ensure that the total length of the damping parts can be as long as possible.

This is possible for instance by making sure the spring parts of the slits at least partially overlap with the damping parts or because the damping parts are further away from the centre or the middle point of the ring than the spring parts.

The invention also relates to a roller bearing or a liquid bearing whereby the inner ring or the outer ring of the roller bearing or liquid bearing comprises a bearing damper element according to the invention.

The invention also relates to a compressor element whereby it contains at least one bearing damper element according to the invention, which is mounted on the shaft of a rotor of the compressor element which is set to compress gas.

The invention also relates to a method to manufacture a bearing damper element according to the invention, whereby the method comprises the following steps:
 the creation of holes through the thickness of the ring in the axial direction by means of drilling, laser drilling and/or die-sink electrical discharge machining;
 the creation of slits between the holes by means of wire electrical discharge machining or abrasive wire cutting

BRIEF DESCRIPTION OF THE DRAWINGS

With the intention of better showing the characteristics of the invention, a few preferred variants of a bearing damper element according to the invention, a bearing and compressor element equipped with such bearing damper element and a method to manufacture such bearing damper element are described hereinafter by way of an example without any limiting nature, with reference to the accompanying drawings, wherein:

FIG. 3 shows a cross-section according to the line III-III in FIG. 2;

DETAILED DESCRIPTION OF THE INVENTION

Figure 1:
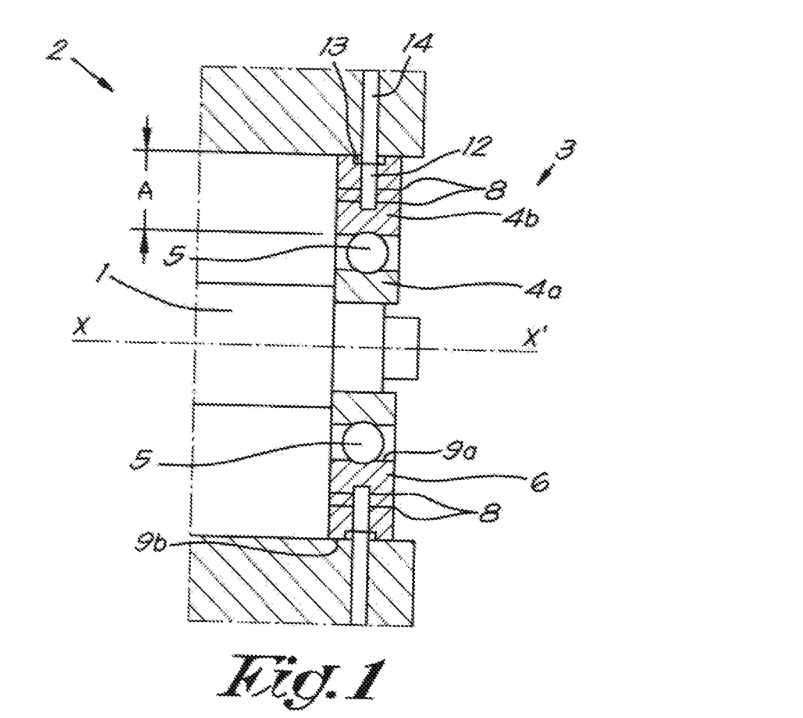
FIG. 1 schematically shows a bearing according to the invention, mounted in a compressor element around the shaft of the rotor.

FIG. 1 schematically shows a part of a rotor shaft 1 supported in a compressor element 2 by means of a roller bearing 3 according to the invention. Instead of the presented roller bearing 3 a liquid bearing could also be applied.

The compressor element 2 could for example be a screw compressor element or a turbo compressor element.

The roller bearing 3 comprises an inner ring 4a and an outer ring 4b, with roller elements 5 in between, whereby the outer ring 4b in this case is made as a bearing damper element 6 according to the invention.

It is of course also possible that the inner ring 4a of the roller bearing 3 is made as a bearing damper element 6 according to the invention.

The bearing 3 with the bearing damper element 6 is mounted on the shaft 1 of the rotor of the compressor element 2, which is set to compress gas.

Figure 2:
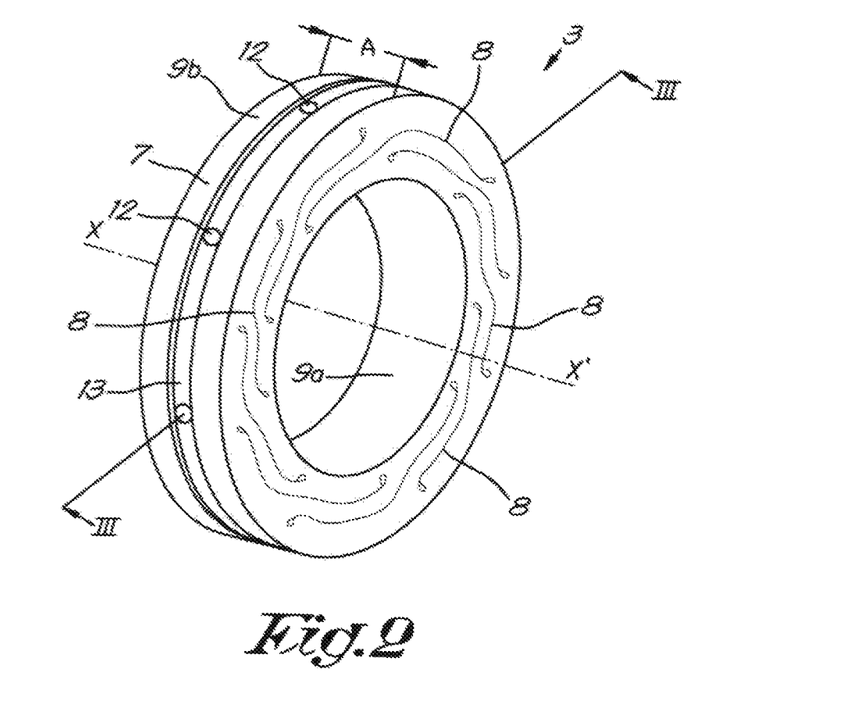
FIG. 2 schematically shows a perspective view of the bearing damper element of FIG. 1.

The bearing damper element 6 is schematically shown in FIG. 2 and a cross-section in FIG. 3.

As is clearly visible in these figures, the bearing damper element 6 comprises a ring 7.

Preferably, but not necessarily for the invention, this ring 7 is made of a metal. A material from which the roller bearing 3 can be manufactured is suitable to manufacture the bearing damper element 6 from.

A number of slits 8 have been made in the ring 7.

According to the invention there are at least three slits 8, and in the example of FIGS. 2 and 3, there are eight slits 8.

These slits 8 are made through the entire thickness A of the ring 7 in the axial direction X-X'.

According to the invention the slits 8 are at a distance of the radial inner and outer surface 9a, 9b of the ring 7, such that the slits do not end or start at one of these surfaces 9a, 9b.

Half of these slits 8 have damping parts 8a that will create a particular damping capacity of the bearing damper element 6, whereby these damping parts 8a are maximum 0.5 millimetres wide, in this case 0.15 millimetres for example.

In this case four of these slits 8 are 0.15 millimetres wide over their entire length, which means the damping part 8a comprises the entire slit 8. The other four slits 8b are wider.

Of course, it is also possible that only a part or several parts of these four slits 8 are maximum 0.5 millimetres wide and that the other part or the other parts of these slits 8 are wider.

It is also possible that some slits 8 are maximum 0.5 millimeters wide over their entire length, a number of other slits 8 are partially maximum 0.5 millimetres wide and the other slits 8 are wider than 0.5 millimetres over their entire length. It is also possible that the damping parts 8a are maximum 0.25 millimetres wide for example.

Said damping parts 8a of the slits, i.e. the narrow parts of the slits 8, are concentric and do not overlap.

'Concentric' in this case means 'concentric in relation to the middle point 10 or the centre 10 of the axis 10 of the ring 7', but that is not necessary for the invention. The damping parts 8a can also be concentric in relation to another point.

In this way, prior to mounting in the compressor element 2, the damping parts 8a of the bearing damper element 6 can be made concentric for example in relation to a point that has somewhat shifted in relation to the geometrically determined middle point 10 to ensure that in a mounted condition after flexure by the weight of the shaft and everything attached to it, the damping parts 8a are concentric in relation to the geometric middle point 10 of the ring 7.

In this case, but not necessarily, the damping parts 8a surround more than 80% of the axis 10 of the ring 7, and in the example more than 90% even, more specifically approximately 95%. The greater the part of the axis 10 of the ring 7 which is surrounded by the damping parts 8a, the greater the damping capacity of the bearing damper element 6. This configuration makes it possible to realise a bearing damper element 6 with a sufficiently high damping capacity in a compact design, which will help to keep the costs low of both the bearing damper element 6 itself and of the bearing 3 or the compressor element 1 in which it is applied. Because they do not overlap, said problem with several thin buffering film dampers in series can be avoided.

According to the preferred embodiment of the invention, at least one slit 8 has one or more spring parts 8b with a minimum width that is greater than the width of the damping parts 8a, in this case 0.5 millimeters for example.

Preferably, the spring parts Bb are at least 0.3 millimetres wide.

These spring parts 8b will create a kind of leaf springs as it were which will determine the rigidity of the bearing damper element 6.

Preferably at least half of the slits 8, comprise one or more such spring parts 8b or wide parts.

In this case half of the slits 8, i.e. four slits 8, completely consist of spring parts 8b, with a width greater than the width of the damping parts 8a, in this case 0.5 millimetres.

Here also it is possible the slits 8 are only 0.5 millimetres wide over a part of their length and are narrower over the other part of their length for example. It is also possible that the slits 8 are (at least) 0.3 millimetres wide instead of 0.5 millimetres over a part of their length.

As shown in FIG. 2, and in the cross-section in FIG. 3, the spring parts 8b overlap, i.e. the wide parts, at least partially with the damping parts 8a.

'Overlapping slits' means that a line that runs through the middle point 10 or the centre 10 of the ring 7, will intersect the slits in question 8.

Preferably the spring parts 8b overlap at least 50%, preferably at least 75% and even more preferably at least 85% with the damping parts 8a. In the shown example this is even more than 95%. The advantage of this is that the damping parts 8a can be made as long as possible.

It can also be deduced from the FIGS. 2 and 3 that the slits 8 through the thickness A of the ring 7 in the axial direction X-X' are point symmetrical and rotation symmetrical in relation to the axis 10 or the middle point 10 or the centre 10 of the ring 7.

Such design will simplify the manufacture of the bearing damper element 6.

The slits 8 are provided on both ends 11 with a hole 11 through the thickness A of the ring 7 in the axial direction X-X'.

As already indicated, these holes 11 have a stress reducing function to lighten the stress which are created during the use of the bearing damper element 6 at the end 11 of the slits 8.

The dimensions of these holes 11 are such that these holes 11 are cylindrical with a diameter that is greater than twice, and preferably three times, the width of the slit 8. In this case for example the diameter of the holes 11 is 2 millimetres.

In this case the holes 11 are drop- or tear-shaped. That is not necessary for the invention, the holes 11 can also be circular, but by making the holes 11 drop- or tear-shaped, the stress concentration there can be reduced.

According to a preferred characteristic of the invention, at least a part of the damping parts 8a of one or more slits 8 is filled with a viscous liquid, such as for example synthetic oil or the like.

Consequently, a thin film damper will be created, which will ensure that the bearing damper element 6, and in particular the damping parts 8a of the slits 8, will have damping capacity.

To this end the ring 7 is provided with a liquid inlet 12 through which said viscous liquid can be supplied to one or more damping parts 8a of one or more slits 8.

In this case the ring 7 is provided with eight such liquid inlets 12, but that is not necessary for the invention.

The liquid inlets 12 have the form of radial perforations in the radial outer surface 9b which continue to the slits 8. The perforations do not continue to the radial inner surface 9a.

Through these liquid inlets 12 the liquid can be supplied to all damping parts 8a of the slits 8 such that these parts can be filled with the liquid. In this case, but not necessarily for the invention, there are two such liquid inlets 12 for every slit 8 consisting of damping parts 8a. The advantage is that it is possible to ensure that the entire slit 8 is filled with the liquid.

Because there are several slits 8, the slits 8 are less long and it is possible to guarantee that every slit 8 is completely filled with the viscous liquid.

The ring 7 is also provided with a ring-shaped groove 13 in the radial outer surface 9b of the ring 7 to lead said viscous liquid via a liquid supply 14, which is provided in the compressor element 1 for example, to the liquid inlets 12 and thus to the damping parts in question 8a of the slits 8.

It is not excluded that the perforations are located in the radial inner surface 9a, whereby the ring-shaped groove 13 is provided in the radial inner surface 9a.

To avoid the rapid outflow of the viscous liquid from the slits 8, the bearing damper element 6 is provided with one or more seals that are located next to the open ends of the slits 8. These seals are not shown on the figures.

The operation of the bearing damper element 6 is very simple and as follows.

During the operation of the compressor element 2, there will be vibrations as a result of the rotating rotors.

These vibrations will at least be partially dampened by the damping parts 8a of the slits 8 that are filled with oil, by means of the operation of the thin film damper.

If it were apparent that the vibrations cannot be dampened enough, the spring parts 8b of the slits 8 acting as leaf springs will accommodate the vibrations and avoid that they can continue in the machine 1 and cause damage in this way.

Although in the aforementioned example the damping parts 8a of the slits 8 have a width of 0.15 millimetres, it is not excluded that the damping parts 8a of the slits 8 have another width. With a calculation model the width of the damping parts 8a and the thickness of the ring 7 in the axial direction can be determined to realise a certain desired damping. In this case the thickness of the ring 7 in the axial direction is 32 millimetres for example. The inner diameter of the ring 7 is 55 millimetres and the outer diameter of the ring 7 is 100 millimetres. In this case the bearing damper element 6 is used to dampen a single row cylindrical roller bearing of the type NU211 which is mounted inside.

The advantage is that less viscous liquid can leak from the damping parts 8a, the damping capacity can be guaranteed better, such that less viscous liquid needs to be supplied.

Although in the aforementioned example the spring parts 8b of the slits 8 have a width of 0.5 millimetres, it is not excluded that the spring parts 8b have another width and preferably are at least twice and even more preferably at least three times wider than the width of the damping parts 8a.

The advantage is that better spring characteristics can be achieved. Indeed, a spring part 8b of a slit 8 shall only be able to accommodate vibrations until the slit 8 is 'closed', which means a wider slit 8 will be able to accommodate more vibrations.

A method according to the invention for the manufacture of a bearing damper element 6 as shown in FIGS. 2 and 3, comprises the following steps:

the creation of holes 11 through the thickness A of the ring 7 in the axial direction X-X' by means of drilling, laser drilling and/or die-sink electrical discharge machining;

the creation of slits 8 between the holes 11 by means of wire electrical discharge machining or abrasive wire cutting.

For the creation of the slits 8, the wire of the machine will be guided through the holes 11 provided in the first step.

For every slit 8 the wire of the machine will have to be stretched or mounted again. Construction-technically it is therefore preferable to manufacture a bearing damper element 6 with as few slits 8 as possible, as this will drastically reduce the manufacturing time.

Figure 4:
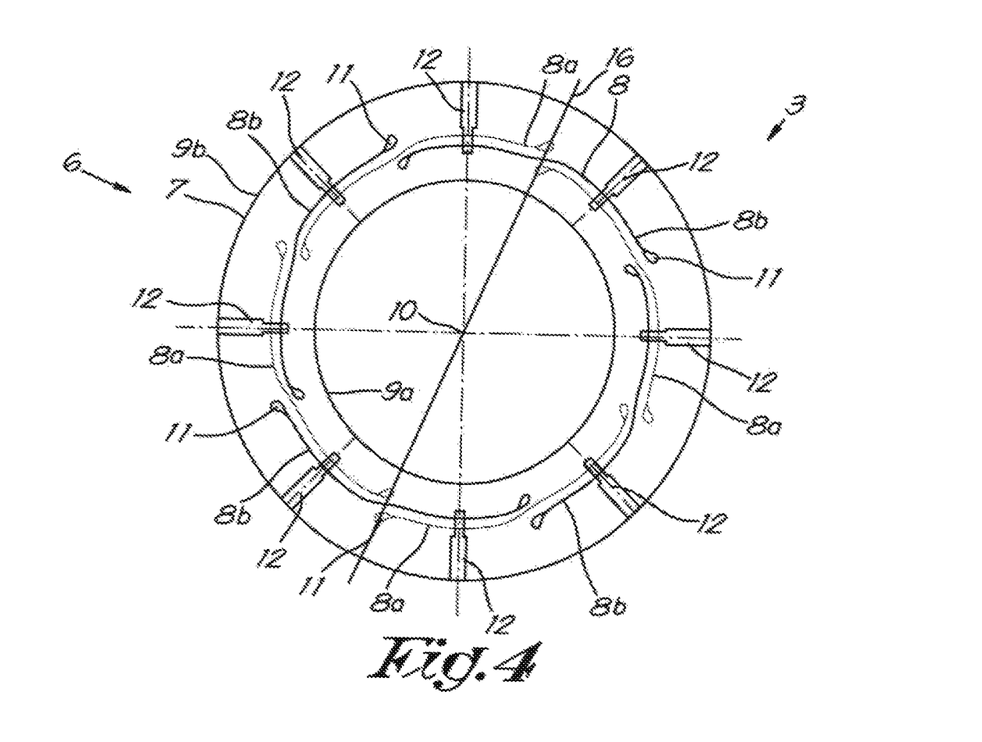
FIG. 4 shows a variant of FIG. 3.

FIG. 4 shows a variant of FIG. 3, whereby the difference lies in the form of the liquid inlets 12. The perforations get narrower in the location where they intersect the slits 8. For the rest this embodiment is identical to that of FIG. 3.

Figure 5:
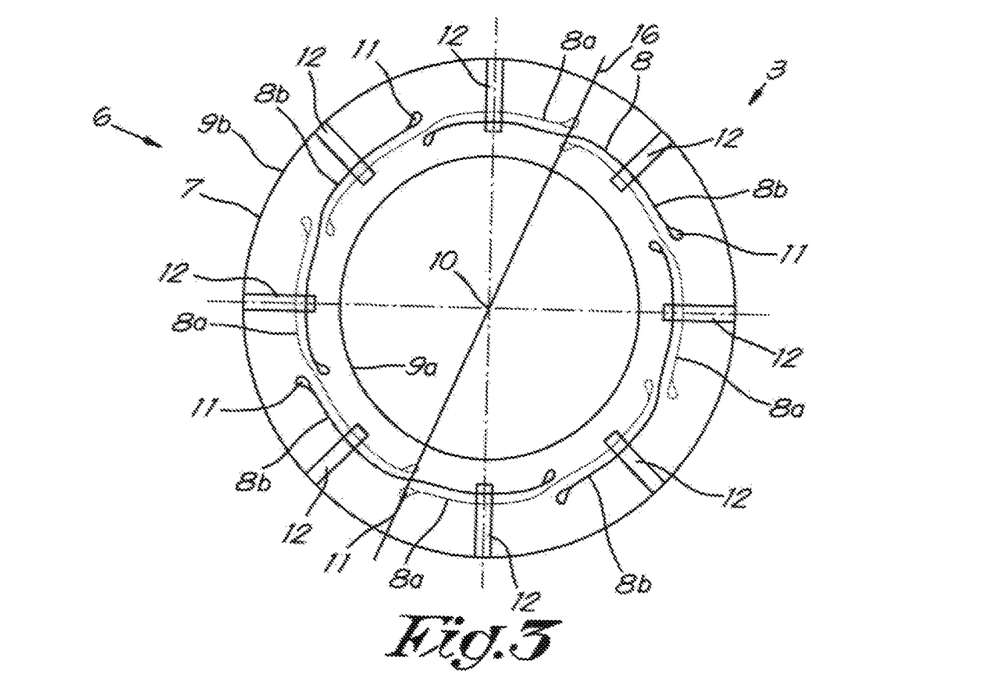
FIGS. 5 to 10 show alternative embodiments of FIGS. 3 and 4.

FIG. 5 shows yet another variant, whereby in this case the wide slits 8b have an adapted form and in this case are provided with an S-shaped part 15. This form is optimised to gradually accommodate the stress. It is possible because the slits 8b do not have a damping function, such that the form thereof can be adapted without it having a negative effect on the damping function of the bearing damper element 6.

Although in this embodiment the liquid inlets 12 have not been drawn, it is of course possible that they are present, for example in the form of those in FIG. 3 or 4.

Figure 6:
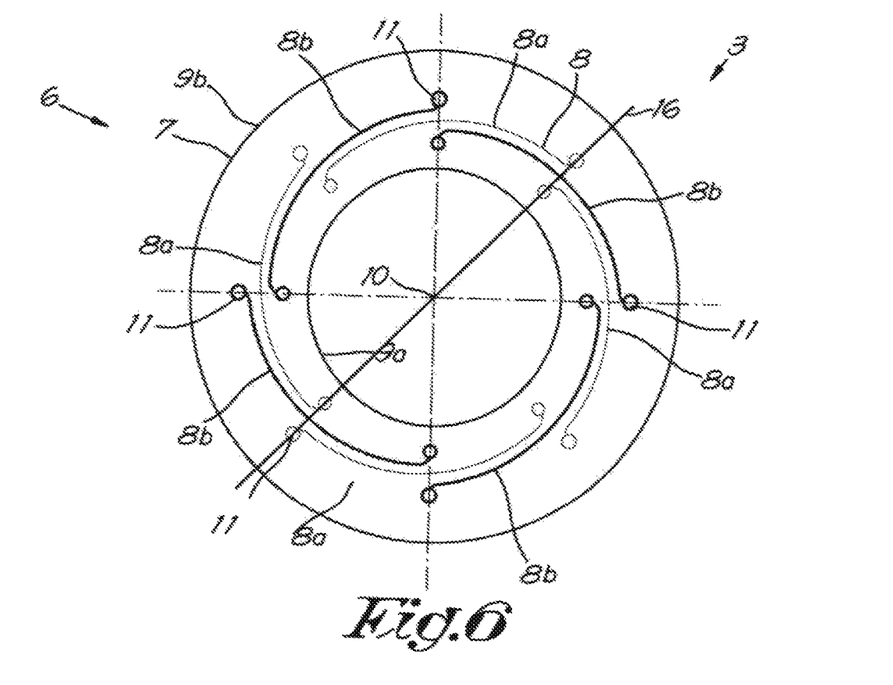

FIG. 6 shows yet another embodiment of FIG. 3, whereby the difference lies in the form of the holes 11 at the end 11 of the slits 8: they are now circular instead of drop- or tear-shaped.

Moreover, the ends 11 of the slits 8 are bent toward the radial inner or outer surface 9a, 9b of the ring 7, the purpose of which is not to affect the damping effect.

Figure 7:
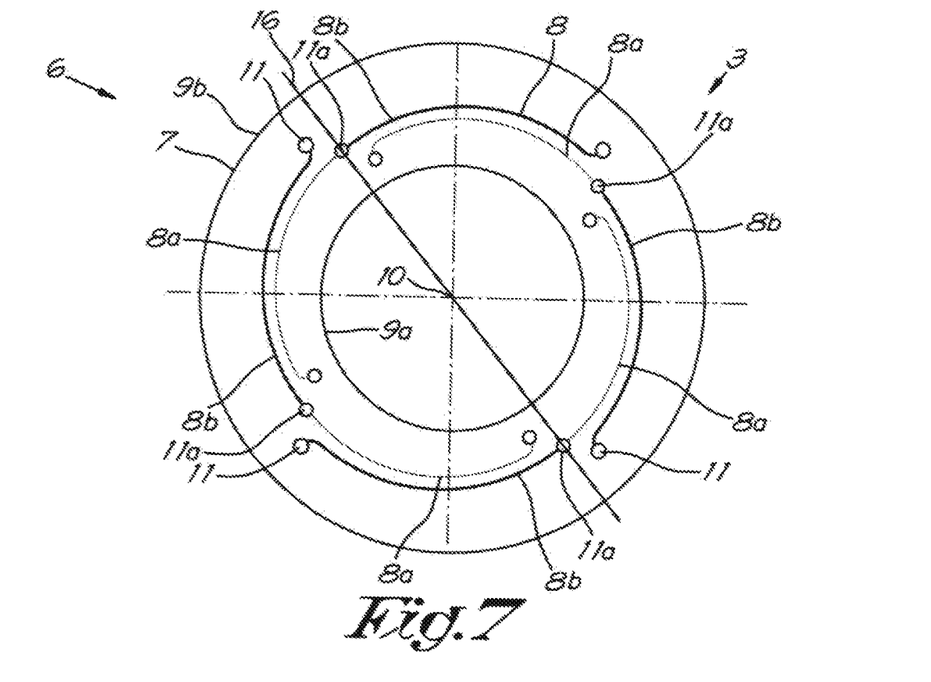

The variant of FIG. 7 relates to a bearing damper element 6 with only four slits 8, whereby every slit 8 is provided with three holes 11, 11a: one at every end 11, and one hole 11a in the middle of the slit 8.

Every slit 8 has both a wide spring part 8b and a narrow damping part 8a, whereby the hole 11a in the middle of the slit 8 marks the division or transition.

The hole 11a in the middle of the slits 8 can also be left out. It is also possible that all holes 11, 11a are left out. If the slits 8 are realised by wire electrical discharge machining, obviously at least one hole 11 must be provided for every slit 8 to be able to stretch the wire.

By combining spring parts 8b with damping parts 8a in one slit 8, a bearing damper element 6 can be created with fewer slits 8 than in the preceding embodiments.

As there are fewer slits 8, the manufacture of the bearing damper element 6 by means of wire electrical discharge machining or abrasive wire cutting will take less time, because the wire needs to be stretched or mounted again less often.

Furthermore, this combination means the length of one damping part 8a will not be longer than in the previous embodiments, such that it is still possible to guarantee that the entire damping part 8a will be filled with oil.

In FIG. 7 the damping parts 8a are located on the inside, i.e. closer to the centre 10, and the spring parts 8b are located on the outside, but vice versa is also possible. If the damping parts 8a are located on the outside, a slightly bigger total damping capacity is possible.

Figure 8:
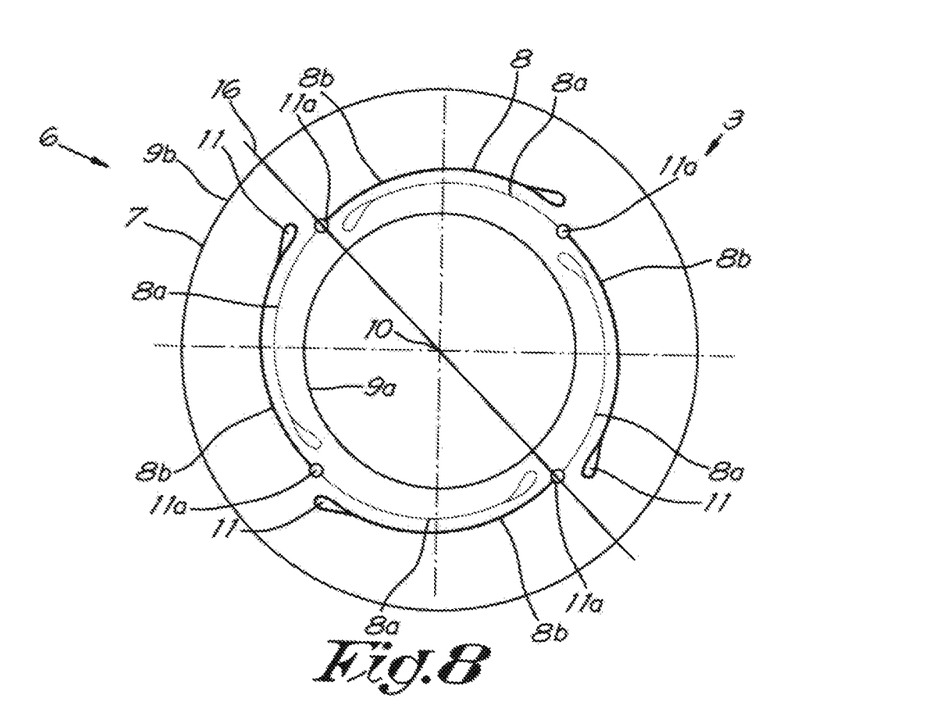

FIG. 8 is a variant of FIG. 7, whereby in this case the holes 44 at the ends of the slits 8 are again drop- or tear-shaped. This has the advantage that the variant according to FIG. 8 can be made in a more compact way than the embodiment according to FIG. 7.

In the variants of FIGS. 7 and 8, the damping parts 8a are further from the centre 10 or the middle point 10 of the ring 7 than the spring parts Bb, causing the length of these damping parts 8a to be longer.

Clearly it is not excluded that the variants of FIGS. 7 and 8 have more than four slits 8, e.g. six slits 8 or even more.

Figure 9:
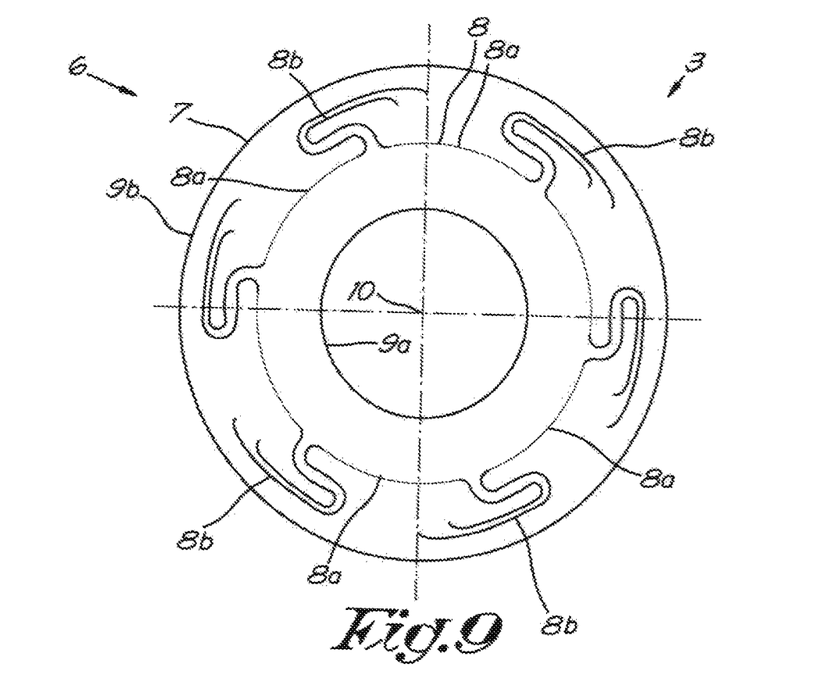

FIG. 9 shows another variant.

Although the design of the slits 8 of this bearing damper element 6 is less compact, an entire uncoupling of the damping characteristics and the spring characteristics is indeed possible in this case.

There are six slits 8, whereby every slit 8 has a curved or bent spring part 8b, a damping part 8a in the shape of a circular segment and a curved or bent spring part Bb successively. The ends 11 of the slits 8 are provided with holes 11. Contrary to FIG. 10, no holes 11a are provided here.

The spring parts 8b of consecutive slits 8 are nested in each other as it were.

The curved or bent spring parts 8b are designed in a way to achieve a maximum reduction of the occurring stress.

As shown in FIG. 9, the damping parts 8a are located closer to the centre 10 or middle point 10 of the ring 7 than the spring parts.

Figure 10:
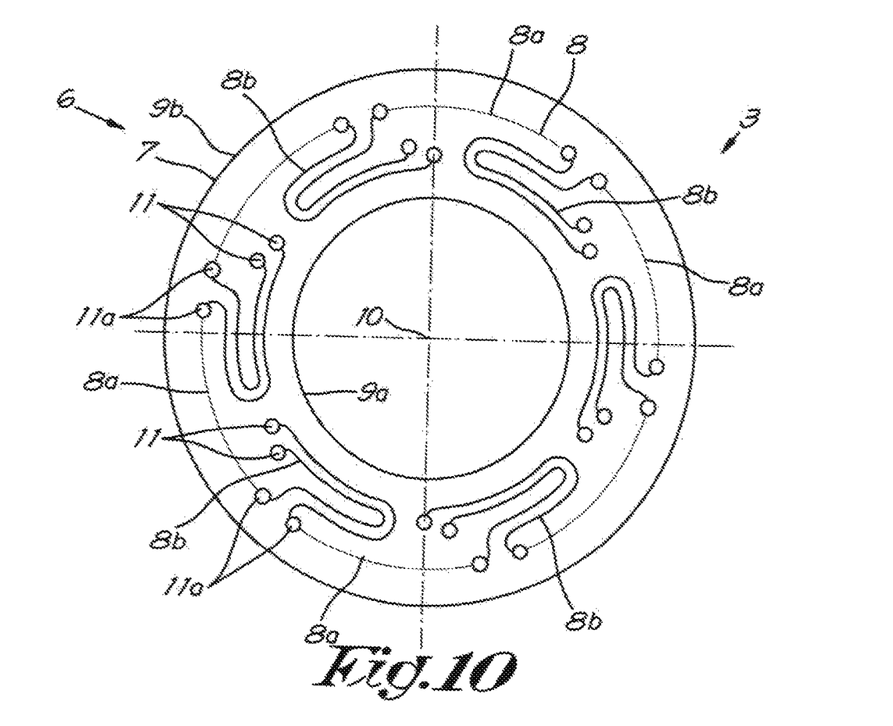

FIG. 10 shows a very similar design, whereby the damping parts 8a are located slightly further from the centre 10 or middle point 10 of the ring 7. Additionally, every slit 8 is provided with four holes 11, 11a: two holes 11 at the ends of the slit 8 and a hole 11a at every transition between spring part 8b and damping part 8a.

It is also possible that no holes 11, 11a are provided, in the same way that it is possible that the embodiment in FIG. 9 is provided with holes 11 at the ends of the slit 8 and a hole 11a at every transition between spring part 8b and damping part 8a.

Although the design of FIGS. 9 and 10 is less compact than that of FIGS. 3 to 8, the advantage of these two embodiments is that the spring characteristics and the damping characteristics are completely uncoupled, this means that to realise a certain rigidity, the appropriate spring parts 8b can be designed and independently of this the damping parts 8a can be designed to realise a desired damping capacity.

In all preceding embodiments, but not necessary for the invention, the distance between the damping parts 8a and the radial surface 9a, 9b of the ring 7 located closest to the damping parts 8a is greater than 15% and preferably greater than 20% of the radius of this radial surface 9a, 9b.

This has the advantage that the slits 8 are not located too closely to these radial surfaces 9a, 9b.

In the embodiments of FIGS. 3 to 8 a split design is possible.

This means that the bearing damper element 6 consists of two parts, with a dividing plane 16 that does not intersect a damping part 8a, as the damping parts 8a of the slits 8 must not be intersected because otherwise the damping characteristics are cancelled out.

Such dividing plane 16 has been indicated in FIGS. 3 to 8. It is clear that thanks to the symmetry, several dividing planes 16 are possible for every embodiment.

An advantage of such split design is that the mounting or installation of the bearing damper element 6 can be done without having to dismantle the entire compressor element 2, as both parts of the bearing damper element 6 can be placed around the rotor shaft 1 instead of the bearing damper element 6 having to be slid over the end of the rotor shaft 1.

The present invention is by no means limited to the embodiments described as an example and shown in the drawings, but a bearing damper element according to the invention, a bearing and compressor element equipped with such bearing damper element and a method to manufacture such bearing damper element, can be realised in all kinds of forms, dimensions and variants without departing from the scope of the invention.

The invention claimed is:

1. A bearing damper element which comprises:
a ring mounted between a rotating object; and
a supporting object which supports the ring,
wherein the ring comprises at least three slits through a thickness of the ring in an axial direction and at a distance between a radial inner and outer surface of the ring,
wherein at least half of the at least three slits have one or more damping parts with a maximum width of 0.5 millimetres, wherein the damping parts are concentric around a center of the ring and do not overlap,
wherein at least a part of the one or more damping parts of the at least three slits are filled with a liquid, and
wherein at least one slit has at least one gap with a minimum width that is greater than the width of the damping parts and configured in a way such that the at least one slit having the at least one gap provides only spring functionality to the ring.

2. The bearing damper element according to claim 1, wherein said ring comprises at least four slits.

3. The bearing damper element according to claim 1, wherein at least a part of at least one of the slits is provided with a hole on both ends through the thickness of the ring in the axial direction.

4. The bearing damper element according to claim 3, wherein said holes at the ends of the slit have a cylindrical diameter that is greater than twice the width of the slit.

5. The bearing damper element according to claim 3, wherein said holes are tear dropped shaped.

6. The bearing damper element according to claim 3, wherein the damping parts as a whole surround the center of the ring by more than 80%.

7. The bearing damper element according to claim 6, wherein the damping parts as a whole surround the center of the ring by more than 90%.

8. The bearing damper element according to claim 1, wherein the ring comprises at least four slits and wherein at least half of the slits have one or more spring parts.

9. The bearing damper element according to claim 1, wherein the spring parts are at least two times wider than the width of the damping parts.

10. The bearing damper element according to claim 1, wherein the spring parts of the slits at least partially overlap with the damping parts.

11. The bearing damper element according to claim 10, wherein the spring parts for at least 50% overlap with the damping parts.

12. The bearing damper element according to claim 11, wherein the spring parts for at least 75% overlap with the damping parts.

13. The bearing damper element according to claim 1, wherein the damping parts are located further from the centre or middle point of the ring than the spring parts.

14. The bearing damper element according to claim 1, wherein the distance between the damping parts and the radial surface of the ring located closest to the damping parts is greater than 15%, of the radius of that radial surface.

15. The bearing damper element according to claim 1, wherein the damping parts of the slits have a width of maximum 0.20 millimetres.

16. The bearing damper element according to claim 1, wherein the slits through the thickness of the ring in the axial direction are point symmetrical and/or rotation symmetrical in relation to the axis or the middle point or the centre of the ring.

17. The bearing damper element according to claim 1, wherein the ring is provided with a liquid inlet through which a liquid can be supplied to at least one of the damping parts of the slits.

18. The bearing damper element according to claim 17, wherein the ring is provided with a ring-shaped groove in one of the radial surfaces of the ring to guide the liquid via one or more liquid inlets to the slits.

19. The bearing damper element according to claim 1, wherein the ring has a split design with a dividing plane that does not intersect a damping part.

20. The bearing damper element according to claim 1, wherein said ring is made of metal.

\* \* \* \* \*

UNITED STATES PATENT AND TRADEMARK OFFICE
CERTIFICATE OF CORRECTION

PATENT NO. : 10,935,073 B2
APPLICATION NO. : 16/618221
DATED : March 2, 2021
INVENTOR(S) : Verrelst et al.

Page 1 of 1

It is certified that error appears in the above-identified patent and that said Letters Patent is hereby corrected as shown below:

On the Title Page

Item Notice, the following text should be canceled:
This patent is subject to a terminal disclaimer.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*